(No Model.) 2 Sheets—Sheet 1.
J. S. SEELEY & C. R. DE LA MATYR.
GRAIN DUMP.
No. 513,205. Patented Jan. 23, 1894.
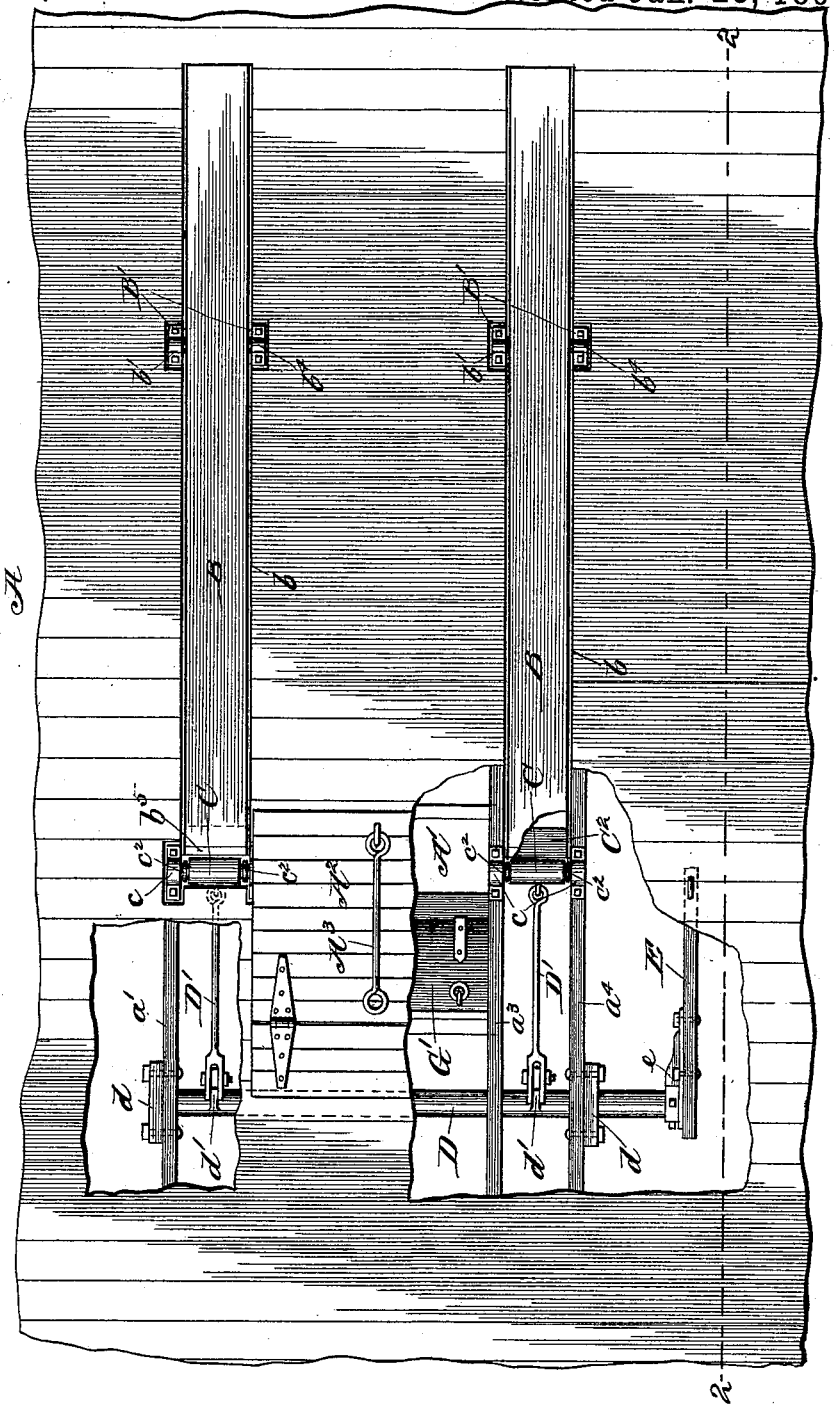
Witnesses
N. C. Coelies
Martin H. Olsen,
Inventors:-
Joseph S. Seeley &
Charles R. De La Matyr
By Dayton, Poole & Brown Attys (No Model.) 2 Sheets—Sheet 2.
J. S. SEELEY & C. R. DE LA MATYR.
GRAIN DUMP.
No. 513,205. Patented Jan. 23, 1894.
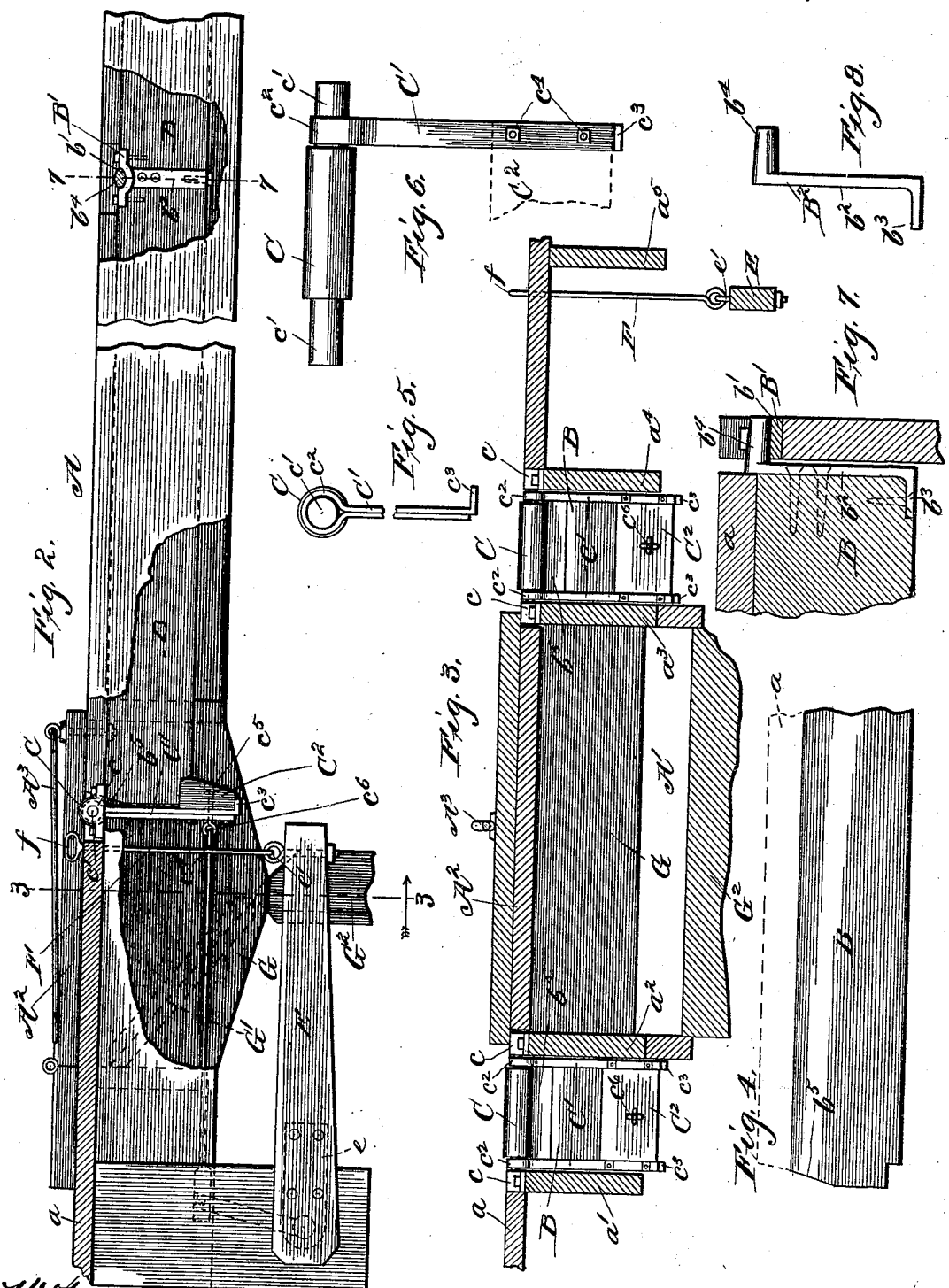
Witnesses
W. C. Coolies
Martin H. Olsen
Inventors
Joseph S. Seeley &
Charles R. De La Matyr
By Dayton Poole & Brown Attys

UNITED STATES PATENT OFFICE.

JOSEPH S. SEELEY AND CHARLES R. DE LA MATYR, OF FREMONT, NEBRASKA.

GRAIN-DUMP.

SPECIFICATION forming part of Letters Patent No. 513,205, dated January 23, 1894.

Application filed September 21, 1891. Serial No. 406,348. (No model.)

*To all whom it may concern:*

Be it known that we, JOSEPH S. SEELEY and CHARLES R. DE LA MATYR, of Fremont, in the county of Dodge and State of Nebraska, have invented certain new and useful Improvements in Grain-Dumps; and we do hereby declare that the following is a full, clear, and exact description thereof, reference being had to the accompanying drawings, and to the letters of reference marked thereon, which form a part of this specification.

This invention relates to grain dumps, and has for its objects, first, to provide a simple and effective locking device by means of which the dump timbers may be firmly held in a horizontal position and readily released to permit them to tilt, and second, to provide improved pivotal connections or trunnions between the dump timbers and their supporting timbers.

To these ends our invention consists in certain novel features which we will first proceed to describe and will then particularly point out in the appended claims.

In the accompanying drawings: Figure 1 is a plan view of a grain dump embodying our invention, portions of the platform being broken away to show the subjacent construction. Fig. 2 is a longitudinal sectional view, taken on the line 2—2 of Fig. 1, portions of one of the joists being broken away. Fig. 3 is a transverse, vertical sectional view, taken on the line 3—3 of Fig. 2. Fig. 4 is a side elevation of the rear portion of one of the dump timbers, detached. Fig. 5 is a side elevation of one of the locking bar hangers and its supporting roller, detached. Fig. 6 is a rear view of the same, the locking bar being indicated in dotted lines. Fig. 7 is a detail sectional view, taken on the line 7—7 of Fig. 2. Fig. 8 is a detail elevation of one of the dump timber hangers, detached.

In the said drawings, A represents the dump platform, comprising the flooring, $a$, and the supporting joists, $a'$, $a^2$, $a^3$, $a^4$, $a^5$, &c. At a suitable point of said platform there is an opening, A', provided with a hinged trap door, A², for closing the same, said trap-door having a rod, A³, by means of which it may be conveniently raised and lowered. The dump-timber openings, $b$, extend from each side of the opening A' forward a suitable distance, coinciding with the spaces between the joists $a'$ $a^2$ and $a^3$, $a^4$, respectively. The dump timbers, B, are located in these openings, being pivotally connected with the platform at a point some distance forward of their center. The connection which we prefer to use at this point is one which we have devised for the purpose, and which is as follows: On each of the two joists between which the dump timber is located is mounted a bearing plate, B', which is bolted or otherwise secured to the joist. This plate is preferably of cast iron and is provided with a semicylindric central portion, $b'$, the upper surface of which forms the bearing surface, the joist being recessed to receive the downward projecting portion thus formed. Each dump-timber is provided, on each of its sides, with a hanger, B², preferably constructed of malleable or wrought iron and comprising a body portion or shank, $b^2$, a lug or toe, $b^3$, and a trunnion, $b^4$. The body and toe are mortised into or countersunk flush with the faces of the dump timber, the former resting against the side of said timber and the latter extending under the bottom of the same, and the two parts being secured by screws in the manner indicated. The trunnion $b^4$ extends outward from the dump timber, and has its under surface curved to fit and rest upon the bearing $b'$ of the plate B'.

At the rear of each opening $b$, there is mounted in suitable bearings, $c$, a roller, C, having reduced end portions, $c'$, upon which are loosely mounted hangers, C'. These hangers are preferably constructed, in the manner shown, of a single strip of metal bent upon itself to form a double body provided with an annular portion or eye, $c^2$, at its upper end to fit one of the reduced ends $c'$ of the roller C, one of the lower ends of said strip being bent out to form a toe, $c^3$, to support the locking bar, C². There are two of these locking bars, one at the rear of each dump timber, and they are preferably constructed of wood and secured to their respective hangers by means of bolts, $c^4$, as shown, or in any other suitable manner. The dump timbers are rabetted at their rear lower portions, to form seats for the locking bars when these latter are in position, and the upper portions of the rear faces of said dump timbers are beveled, as shown at $b^5$, the front face of the locking bars being similarly beveled, as shown at $c^5$, for the purpose hereinafter set forth.

D is a rock-shaft, mounted in suitable bearing-pieces, $d$, depending from the joists $a'$, $a^4$, and provided with two arms, $d'$, to which are respectively pivoted the rear ends of two connecting rods, D', the front ends of these rods being connected to the respective locking bars $C^2$. In the form of connection at this point which we have shown, the front end of each connecting rod D' is formed into an eye which engages the corresponding eye of an eye-bolt, $c^6$, secured to the locking bar $C^2$. One end of the rock-shaft D is extended laterally beyond its bearing and has secured to it a heavy arm E, of sufficient weight to hold the several parts normally in the position shown, and to tend to return them to such position when displaced. In the construction shown this arm is of some heavy wood, such as oak, and is bolted to a metallic end plate or supplemental arm, $e$, secured on the end of the rock-shaft D.

F is an operating rod, loosely connected with the free end of the arm E, as, for instance, by an eye-bolt, $e'$, and extending upward through a suitable aperture in the flooring $a$ of the platform A, where it terminates in a handle, $f$, by means of which it may be conveniently operated.

We have shown the hopper G under the opening A' provided with a hinged valve or apron, G', by means of which the grain may be directed to either side of the upright, $G^2$, but this feature forms no part of our present invention.

The operation is as follows: The parts being in the position shown, the wagon to be unloaded is driven upon the dump timbers, the door $A^2$ opened, and the valve G' arranged as desired. The locking bars $C^2$ hold the dump timbers firmly in place until the handle $f$ of the operating rod F is grasped and said rod pulled upward, when, by means of the intermediate mechanism shown and described, the locking bars are withdrawn from under the dump timbers, whereupon the dump timbers will tilt upon their pivots and the contents of the wagon will be discharged in the usual manner. During the downward movement of the rear ends of the dump timbers, the rear wheels of the wagon bear upon the rollers C, and thus prevent rubbing friction between the wheels and the platform. When the dump timbers are being restored to their normal position, the beveled faces $b^5$ of their rear ends come into contact with the corresponding faces $c^5$ of the locking-bars $C^2$, and cause these latter to yield for the passage of the dump timbers. When these latter have resumed the position shown, the locking-bars are forced into place under the same by the weight of the arm E and by their own weight, and the dump timbers are again firmly locked in position. The dump timbers can, when necessary, be lifted out of their bearings without any preliminary disconnecting of the parts, and the bearings are simple and effective and take up but little space.

It will be noted that the upper surface of each locking-bar and the under surface of the dump timber which rests thereon are both horizontal when the parts are locked, so that the dump timbers rest squarely on the locking bars, thereby preventing accidental disengagement through slipping off by reason of ice in winter or of other causes.

We claim as our invention—

1. In a grain dump, the combination, with a platform and tilting dump timbers, of locking bars adapted to engage and support the dump timbers, pivoted hangers supporting said locking bars, a rock-shaft having arms, rods connecting said arms and the locking bars, a weight-arm on said rock shaft, and an operating rod connected with said weight-arm and extending upward through the platform, substantially as described.

2. In a grain dump the combination with a platform and tilting dump timbers of rollers mounted transversely on the platform, one at the rear of each dump timber, hangers pivotally suspended from said rollers, locking bars secured to the lower ends of said hangers and adapted to engage and support said dump timbers, a rock shaft having arms, rods connecting said arms with the locking bars, and an operating rod connected with said rock shaft, substantially as described.

3. In a grain dump the combination with tilting dump timbers, of locking bars adapted to engage and support the dump timbers, pivoted hangers supporting said locking bars, a rock shaft having radial arms connected with the locking bars, and an operating rod connected with said rock shaft, the ends of the tilting dump timbers and locking bars being oppositely beveled, whereby they will automatically latch when the dump timbers are raised, substantially as described.

4. In a grain dump, the combination, with a platform having elongated openings to receive the dump-timbers and bearing plates arranged on each side of the said openings and having semi-cylindric bearing surfaces, of the dump timbers, and hangers secured to each side of each dump timber and having a body portion and a toe at a right angle thereto, both mortised into the dump timber, and a lateral trunnion projection to fit the bearing surface of the corresponding bearing plate, substantially as described.

In testimony that we claim the foregoing as our invention we affix our signatures in presence of two witnesses.

JOSEPH S. SEELEY.
CHARLES R. DE LA MATYR.

Witnesses:
WM. E. SMAILS,
VICTOR SEITZ.